(12) United States Patent
Richards et al.

(10) Patent No.: US 11,761,786 B2
(45) Date of Patent: Sep. 19, 2023

(54) METHODS AND SYSTEMS FOR AUTOMATIC GENERATION AND DISTRIBUTION OF CURBSIDE MAP DATA

(71) Applicant: IBI GROUP PROFESSIONAL SERVICES (CANADA) INC., Toronto (CA)

(72) Inventors: Peter Colin Richards, Toronto (CA); Anthony Albert Sgro, Toronto (CA); Jacob Thomas Malleau, Guelph (CA); Anthony Michael De Crescenzo, Hamilton (CA); Adam Matthew Wenneman, Toronto (CA)

(73) Assignee: ARCADIS PROFESSIONAL SERVICES (CANADA) INC., Toronto (CA)

( * ) Notice: Subject to any disclaimer, the term of this patent is extended or adjusted under 35 U.S.C. 154(b) by 98 days.

(21) Appl. No.: 17/199,705

(22) Filed: Mar. 12, 2021

(65) Prior Publication Data

US 2021/0285792 A1   Sep. 16, 2021

Related U.S. Application Data

(60) Provisional application No. 62/989,085, filed on Mar. 13, 2020.

(51) Int. Cl.
*G01C 21/00* (2006.01)
*G06F 16/29* (2019.01)
*G06T 11/60* (2006.01)
*G06F 18/24* (2023.01)

(52) U.S. Cl.
CPC ..... *G01C 21/3807* (2020.08); *G01C 21/3867* (2020.08); *G01C 21/3889* (2020.08); *G01C 21/3896* (2020.08); *G06F 16/29* (2019.01); *G06F 18/24* (2023.01); *G06T 11/60* (2013.01)

(58) Field of Classification Search
CPC ................ G06F 16/29; G06T 11/60
See application file for complete search history.

(56) References Cited

U.S. PATENT DOCUMENTS

| | | | | |
|---|---|---|---|---|
| 8,063,797 | B1* | 11/2011 | Sonnabend | G08G 1/0129 340/932.2 |
| 8,484,151 | B1* | 7/2013 | Lookingbill | G08G 1/147 706/46 |
| 9,754,487 | B1* | 9/2017 | Woodard | G08G 1/148 |
| 11,580,521 | B2 | 2/2023 | Sawyer et al. | |
| 2017/0191849 | A1* | 7/2017 | Agam | G08G 1/148 |
| 2017/0309170 | A1* | 10/2017 | Wang | G08G 1/144 |
| 2018/0268322 | A1* | 9/2018 | Liu | G08G 1/148 |
| 2019/0335167 | A1* | 10/2019 | Fateh | H04N 13/344 |

(Continued)

*Primary Examiner* — Phi Hoang
(74) *Attorney, Agent, or Firm* — DENTONS CANADA LLP

(57) ABSTRACT

Disclosed are methods and systems for automatic generation and distribution of curbside map data. A server receives municipal regulation data from an external source, and processes the municipal regulation data to generate curbside map data. The server also transmits a message conveying at least a portion (e.g. relevant portion based on request) of the curbside map data to a client computing device. By obtaining and processing the municipal regulation data, the curbside map data can be generated and distributed without time consuming and error prone disadvantages of manual surveying.

27 Claims, 8 Drawing Sheets

(56) References Cited

U.S. PATENT DOCUMENTS

2019/0371175 A1\* 12/2019 Joos .................. G06F 16/29
2021/0095975 A1\* 4/2021 Mubarek .............. G08G 1/0141
2021/0224820 A1\* 7/2021 Frankel ................ G07C 5/0808

\* cited by examiner

METHODS AND SYSTEMS FOR AUTOMATIC GENERATION AND DISTRIBUTION OF CURBSIDE MAP DATA

RELATED APPLICATION

This patent application claims priority to U.S. Provisional Patent Application No. 62/989,085 filed on Mar. 13, 2020, the entire disclosure of which is incorporated by reference.

FIELD OF THE DISCLOSURE

The present disclosure relates to communication systems, and more particularly to communication systems for generation and distribution of curbside map data.

BACKGROUND

Digital maps offer numerous advantages over traditional paper maps, including an ability to provide additional data sets layered atop geographic features. The additional data sets can for example include parking restrictions (e.g. no parking zones, loading zones, etc.) or other curbside information.

Most municipalities have road centreline data in a map-based file, but there is significant effort to augment a basic map of road centrelines with additional data sets. An existing approach involves manually surveying roads to identify parking restrictions or other curbside information, and then augmenting a basic map to include those parking restrictions or other curbside information.

Unfortunately, the existing approach is both time consuming due to the manual surveying and error prone because parking restrictions or other curbside information could be easily missed or overlooked by the manual surveying. For example, a sign indicating no parking in an area might be knocked down or otherwise not clearly visible, resulting in it being missed or overlooked even with a concerted effort in surveying. Also, some signs could be incorrect or out of date, resulting in surveyed data being problematic, and surveyed data can be rendered out of date as regulations change.

For at least these reasons, generating and distributing the curbside map data using the existing approach may not result in accurate and up-to-date information being distributed in a timely manner. Therefore, the existing approach leaves much to be desired.

SUMMARY OF THE DISCLOSURE

Disclosed is a method for execution by a server. The method involves receiving municipal regulation data from an external source, and processing the municipal regulation data to generate curbside map data. The method also involves transmitting a message conveying at least a portion (e.g. relevant portion based on request) of the curbside map data to a client computing device. In this way, the client computing device can be informed of parking restrictions or other curbside information provided by the curbside map data in a timely manner.

Notably, the method is executed automatically by the server and does not rely on any manual surveying. Rather, in accordance with an embodiment of the disclosure, the method utilizes municipal regulation data, which should be accurate and is considered to be a "source of truth" in some jurisdictions. By obtaining and processing this municipal regulation data, the curbside map data can be generated and distributed without time consuming and error prone disadvantages of manual surveying.

Also disclosed is a server having a network adapter and curbside mapping circuitry. The curbside mapping circuitry is configured to receive municipal regulation data from an external source via the network adapter, process the municipal regulation data to generate curbside map data, and transmit a message conveying at least a portion (e.g. relevant portion based on request) of the curbside map data to a client computing device via the network adapter.

Other aspects and features of the present disclosure will become apparent, to those ordinarily skilled in the art, upon review of the following description of the various embodiments of the disclosure.

BRIEF DESCRIPTION OF THE DRAWINGS

Embodiments will now be described with reference to the attached drawings in which.

DETAILED DESCRIPTION OF EMBODIMENTS

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Introduction

Figure 1:
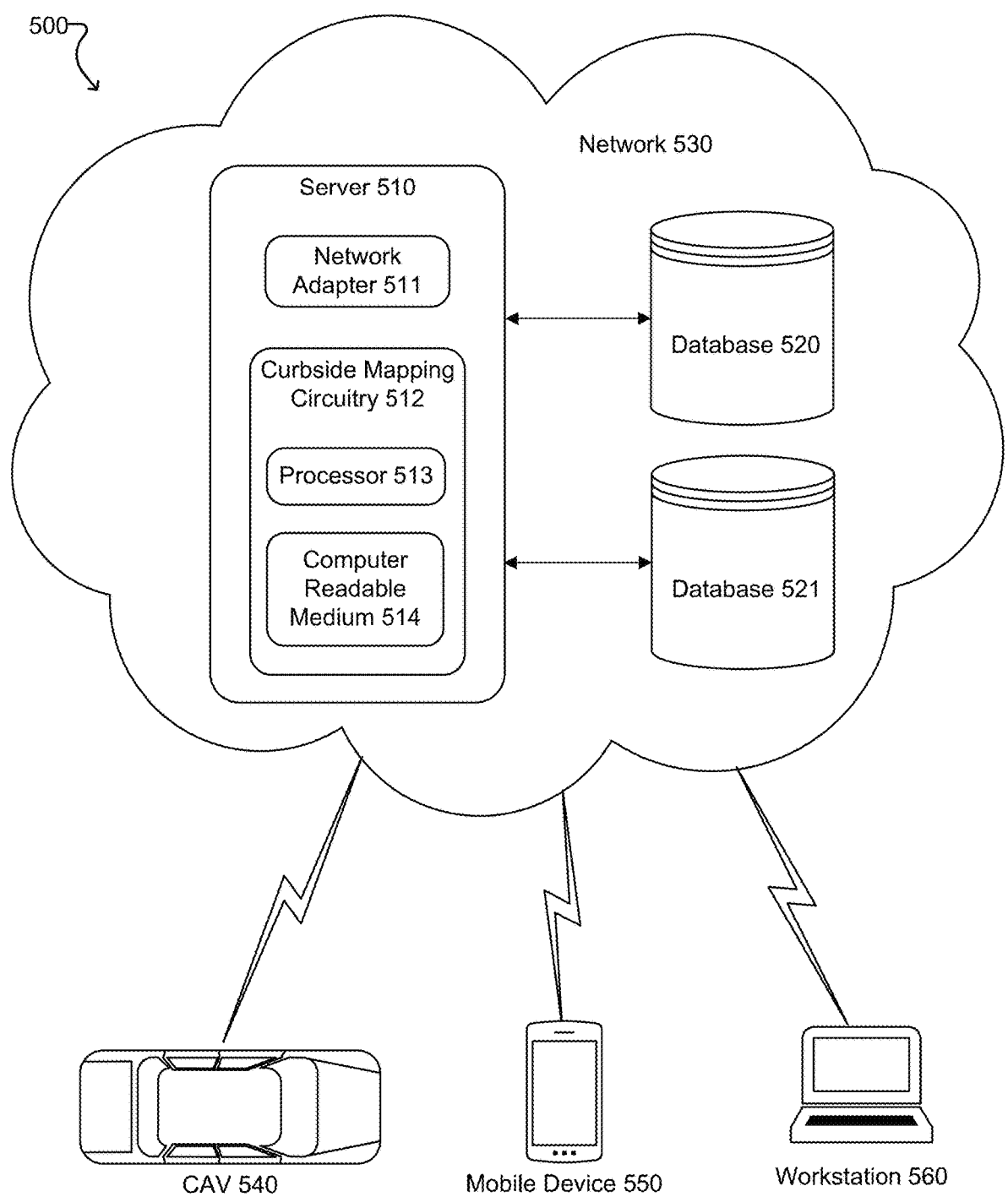
FIG. 1 is a block diagram of an example communication system having a server that operates to generate and distribute curbside map data.

Referring first to FIG. 1, shown is a block diagram of an example communication system 500 having a server 510 that operates to generate and distribute curbside map data. The communication system 500 also has a network 530, one or more external databases 520,521 storing municipal regulation data, and one or more client computing devices 540,550,560. The communication system 500 can have other components as well, but these are not shown for simplicity.

The server 510 has a network adapter 511 for communicating with the one or more client computing devices 540,550,560 and/or the one or more databases 520,521 over the network 530. The server 510 also has curbside mapping circuitry 512. In some implementations, the curbside mapping circuitry 512 includes a processor 513 that executes software, which can stem from a computer readable medium 514. However, other implementations are possible and are within the scope of this disclosure. The server 510 can have additional components, but these are not shown for simplicity.

Figure 2:
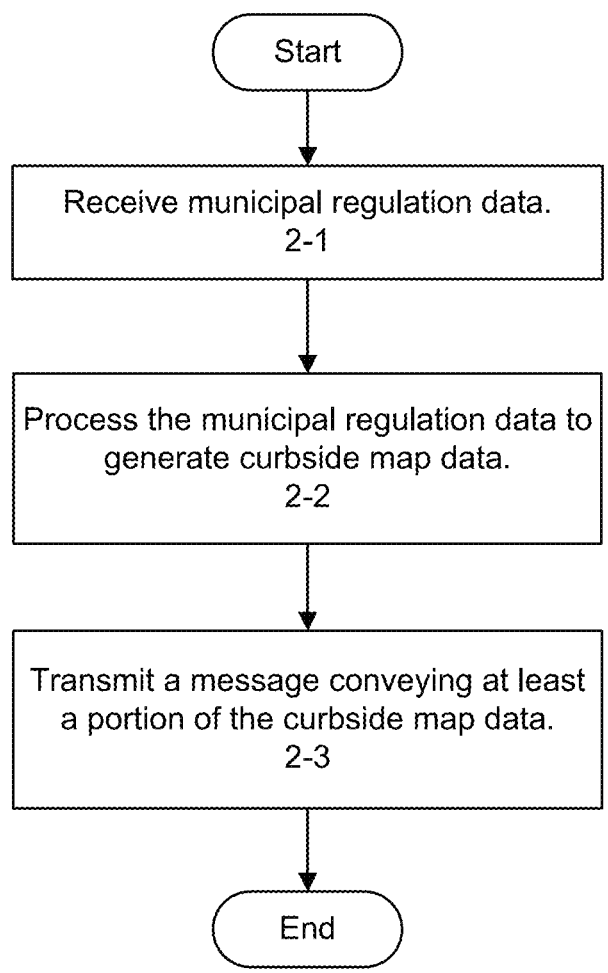
FIG. 2 is a flowchart of a method of automatically generating and distributing curbside map data.

The curbside mapping circuitry 512 of the server 511 operates to generate and distribute curbside map data. The curbside map data includes curbside information such as parking restrictions (e.g. no parking zones, loading zones, etc.) in a region for a date/time that has been identified. Such operation will be described below with reference to FIG. 2, which is a flowchart of a method of automatically generating and distributing curbside map data. Although the method of FIG. 2 is described below with reference to the server 510 in the communication system 500 shown in FIG. 1, it is to be understood that the method of FIG. 2 is applicable to other communication systems. In general, the method of FIG. 2 is applicable to the server 510 in any appropriately configured communication system.

At step 2-1, the server 510 receives municipal regulation data from an external source via the network adapter 511. There are many possibilities for the external source. In some implementations, the server 510 receives the municipal regulation data from one of the external databases 520,521. In some implementations, the server 510 requests the municipal regulation data from the external database 520, 521 that is associated with a region for the curbside map data to be generated, and the municipal regulation data that is relevant for that region is returned to the server 510. In other implementations, the server 510 receives the municipal regulation data without any specific request. For instance, the server 510 could be subscribed to a service in which the municipal regulation data is supplied to the server 510 on a periodic basis or whenever there are changes or updates to the municipal regulation data.

At step 2-2, the server 510 processes the municipal regulation data to generate the curbside map data using the curbside mapping circuitry 512. There are many possibilities for the curbside map data. In some implementations, the curbside map data is a curbside layer for a digital map to convey curbside restrictions (e.g. no parking zones, loading zones, etc.). Such curbside layer can for example be a GIS file (e.g. geoJSON, or Shape) that is geo referenced and contains all regulation data for each curb segment. Specific example details of how the curbside map data can be generated are described later with reference to FIGS. 5 and 5A to 5C.

At step 2-3, the server 510 transmits a message conveying at least a portion (e.g. relevant portion based on request) of the curbside map data to the one or more client computing devices 540,550,560 via the network adapter 511. In this way, the one or more client computing devices 540,550,560 can be informed of parking restrictions or other curbside information provided by the curbside map data in a timely manner.

There are many ways that the server 510 can identify the portion of the curbside map data to be transmitted. In some implementations, the server 510 receives a request message for curbside map data, and the portion of the curbside map data that is returned in response to the request is based on the request message. An example of this will be described in further detail below with reference to FIG. 4. In other implementations, the server 510 identifies the portion of the curbside map data to be transmitted by other means. In alternative implementations, the server 510 simply transmits the entire curbside map data.

In some implementations, the message transmitted at step 2-3 conveys the curbside map data as a curbside layer for a digital map, such that the one or more client computing devices 540,550,560 can generate the digital map having the curbside layer. In other implementations, the message incudes the digital map with the curbside layer. More generally, the message conveys the curbside map data, such that the one or more client computing devices 540,550,560 can ascertain the curbside map data and identify parking restrictions (e.g. no parking zones, loading zones, etc.) and/or other curbside information.

Figure 3:
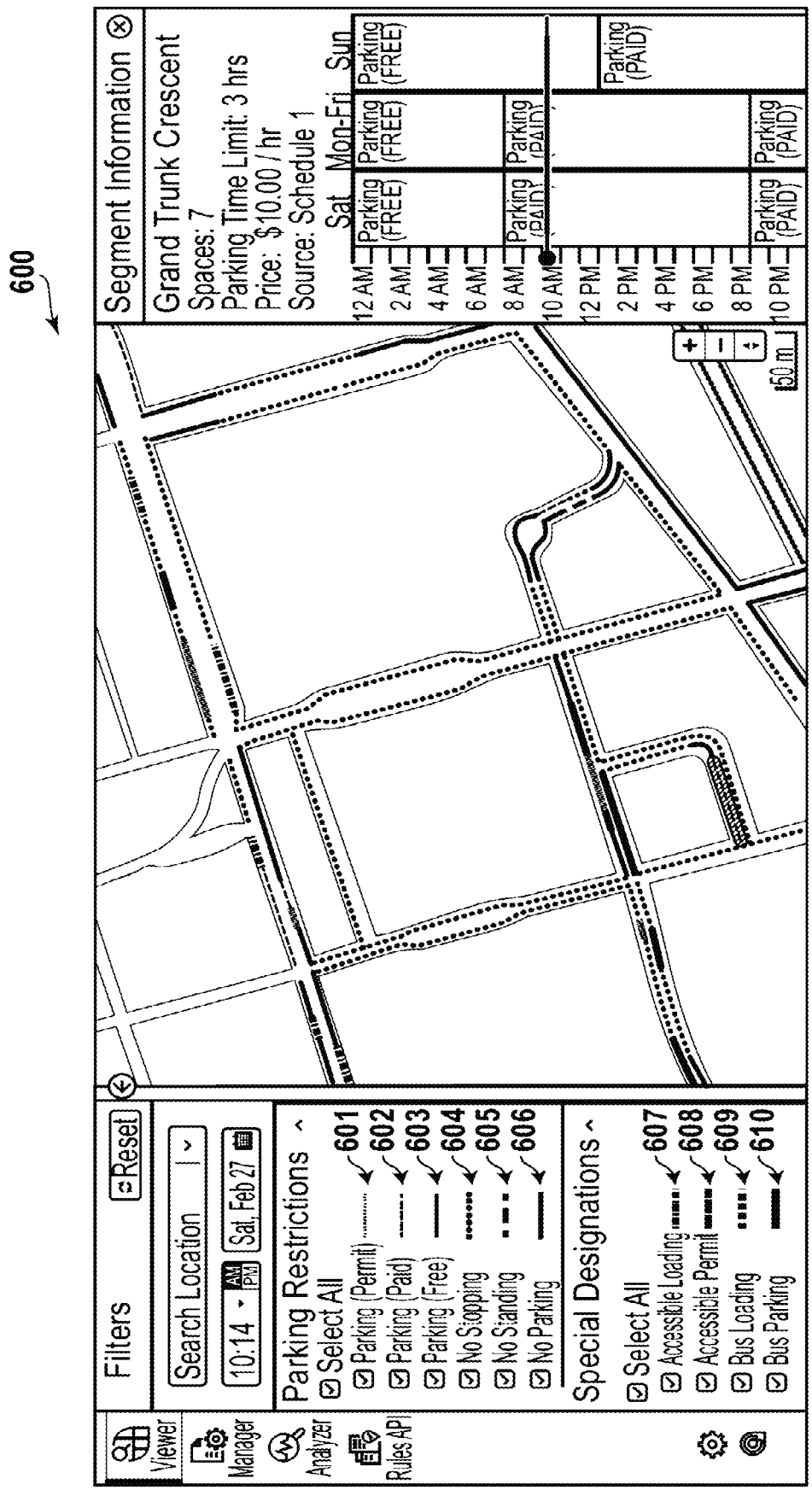
FIG. 3 is a schematic of an example digital map having a curbside layer.

Referring briefly to FIG. 3, shown is a schematic of an example digital map 600 having a curbside layer 601 to 610. The curbside layer 601 to 610 is a specific example of curbside map data and includes segments for permit parking 601, paid parking 602, free parking 603, no stopping 604, no standing 605, no parking 606, accessible loading 607, accessible permit 608, bus loading 609, and bus parking 610. Other segments are possible and are within the scope of the disclosure. Note that some of the segments may be time and date dependent. For instance, some parking restrictions can may exist only during certain times on weekdays. The segments for temporary no parking 606 can be generated for example when the regulation data indicates no parking due to construction, snow removal, or some other transient issue. It is to be understood that the digital map 600 shown in FIG. 3 is very specific and is provided merely as an example.

Referring back to FIGS. 1 and 2, it is noted that the method is executed automatically by the server 510 and does not rely on any manual surveying. Rather, in accordance with an embodiment of the disclosure, the server 510 utilizes municipal regulation data, which should be accurate and is considered to be a "source of truth" in some jurisdictions. By obtaining and processing this municipal regulation data, the curbside map data can be generated and distributed without time consuming and error prone disadvantages of manual surveying. Also, transient issues affecting parking (e.g. temporary no parking due to snow removal) can be accounted for in real-time or as quickly as the municipal regulation data can be updated.

As used herein, the "curbside map data" that is generated and distributed includes curbside information for use with a street map. The curbside map data goes beyond information provided by a street map because the curbside map data includes parking restrictions (e.g. no parking zones, loading zones, etc.) or other curbside regulatory restrictions based on the municipal regulation data, and could also include parking details like parking price, maximum stay, etc. As alluded to above, the curbside information that is generated and distributed can optionally include map data (e.g. street names, etc.). Such "map data" means a base map to view regulations using any suitable platform, for example Google Maps. However, distributing such map data is not essential. For instance, a client computing device could already have a street map layer stored, such that the client computing device can overlay a curbside layer (based on the curbside map data received from the server 510) on the street map layer.

There are many possibilities for the one or more client computing devices 540,550,560. In some implementations, each client computing device 540,550,560 is any suitable device having a base map that can be populated with a curbside layer based on the curbside map data received from the server 510. The one or more client computing devices 540,550,560 can for example include a CAV (Connected and Automated Vehicle) 540, a mobile wireless device 550, a workstation 560, and/or any other suitable client computing device. Some other possibilities can include computing devices used with navigation platforms (Google Maps layer), Transportation Network Company apps, Couriers (loading info), parking payment app, and/or enforcement software. The client computing devices 540,550,560 can communicate with the server 510 using wireless connections as depicted or wired connections. For example, the CAV 540 and the mobile wireless device 550 could each be equipped with a WAN (Wide Area Network) radio for wirelessly communicating with the network 530. Similarly, the workstation 560 can be equipped with a network adapter, which may or may not be wireless, for communicating with the network 530. The workstation 560 can be a desktop computer, a laptop computer, a tablet computer, or any other suitable client computing device. Although three client computing devices 540,550,560 are depicted, it is to be understood that there can be more or less than three computing devices. Typically there can be numerous client computing devices.

There are many possibilities for the one or more databases 520,521. The one or more databases 520,521 can for example be external databases storing municipal regulation data. In some implementations, each municipality has its own database that is separate from the server 510. Thus, for several municipalities, the server 510 can be coupled to several external databases. However, other implementations are possible in which there is a single external database for storing all municipal regulation data. In other implementations, the municipal regulation data is acquired from an external source, such that there might not be any external database. Other implementations are possible and are within the scope of the disclosure.

There are many possibilities for the network 530. The network 530 can include several different networks even though such details are not shown for simplicity. For example, the network 530 can include a RAN (Radio Access Network) for communicating with wireless stations and an Internet for communicating with numerous other computing devices. The network 530 can have other components as well, but these details are not shown for simplicity.

There are many possibilities for the network adapter 511 of the server 510. In some implementations, the network adapter 511 is a single network adapter 511. In other implementations, the network adapter 511 includes multiple network adapters, for example a first network adapter for communicating with the one or more client computing devices 540,550,560, and a second network adapter for communicating with the external databases 520,521. Both wireless and wired network adapters are possible. Any suitable network adapter that can communicate via the network 530 is possible.

According to another embodiment of the disclosure, there is provided a non-transitory computer readable medium having recorded thereon statements and instructions that, when executed by the processor 513 of the server 510, implement a method as described herein. The non-transitory computer readable medium can be the computer readable medium 514 of the server 511 shown in FIG. 1, or some other non-transitory computer readable medium. The non-transitory computer readable medium can for example include an SSD (Solid State Drive), a hard disk drive, a CD (Compact Disc), a DVD (Digital Video Disc), a BD (Blu-ray Disc), a memory stick, or any appropriate combination thereof.

The illustrated examples described herein focuses on software implementations in which software is executed by the processor 513 of the server 510. In some implementations, the software provides an API (Application Programming Interface) that enables the one or more client computing devices 540,550,560 to interact with the server 510. However, other implementations are possible and are within the scope of this disclosure. It is noted that other implementations can include additional or alternative hardware components, such as any appropriately configured FPGA (Field-Programmable Gate Array), ASIC (Application-Specific Integrated Circuit), and/or microcontroller, for example. More generally, the curbside mapping circuitry 512 of the server 511 can be implemented with any suitable combination of hardware, software and/or firmware.

Example Signaling & Processing

Figure 4:
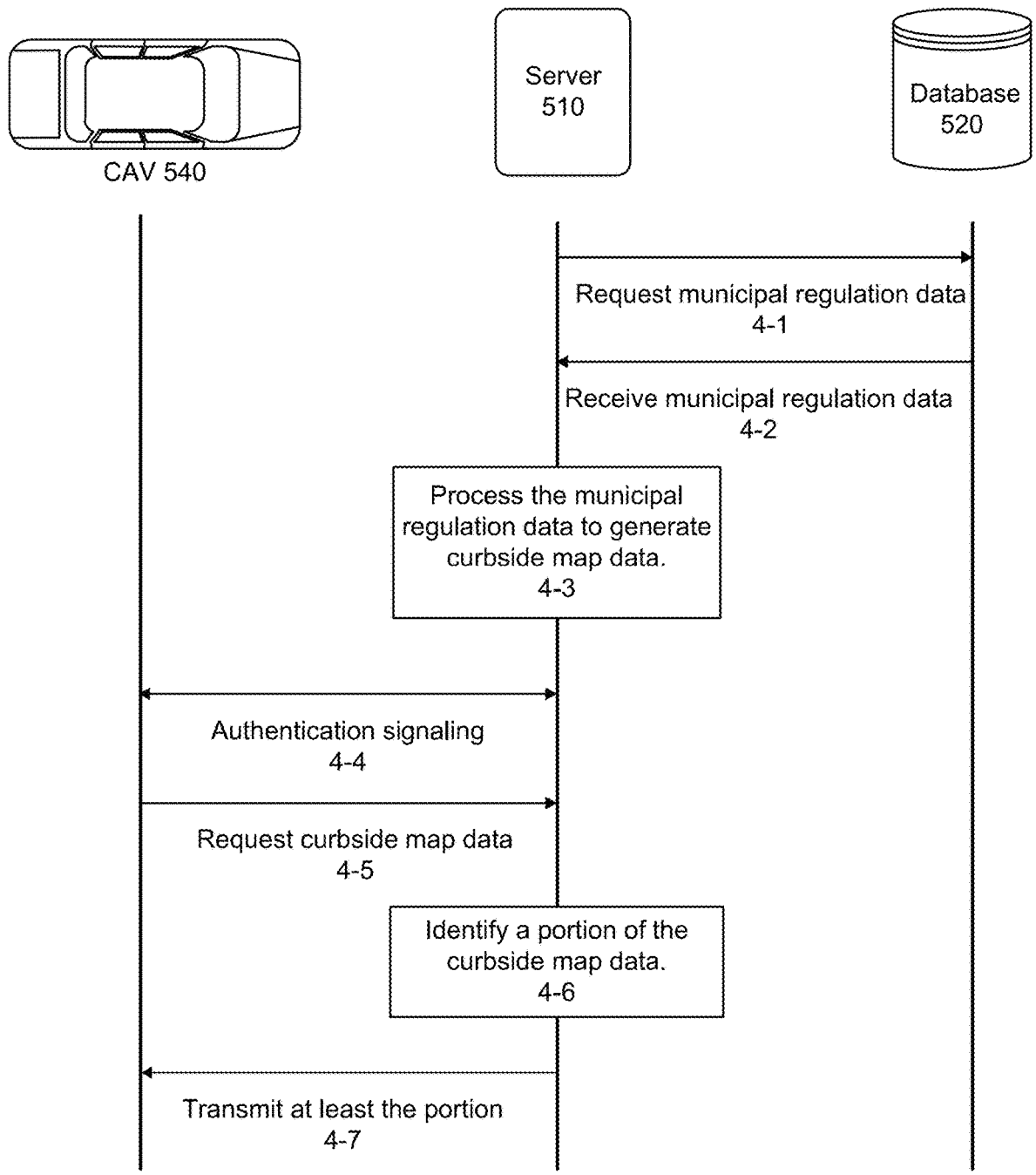
FIG. 4 is a sequence diagram of example signalling and processing by the server of FIG. 1.

Referring now to FIG. 4, shown is a sequence diagram of example signalling and processing by the server 510 of FIG. 1. It is to be understood that the signalling and processing shown in FIG. 4 is very specific and is provided merely as an example. Also, while the signaling is shown to involve the CAV 540 and the database 520, it is noted that signalling involving other components is possible and is within the scope of the disclosure.

At step 4-1, the server 510 requests municipal regulation data. In the illustrated example, the municipal regulation data is requested from the external database 520. In some implementations, the server 510 determines from which external source to request the municipal regulation data. For example, if the server 510 is aware that municipal regulation data is desired for a given region, and the external database 520 has municipal regulation data for that region, then the server 510 can request that municipal regulation data from the external database 520.

At step 4-2, the server 510 receives the municipal regulation data. Note that the municipal regulation data is received in response to the request sent at step 4-1. However, in other implementations, the municipal regulation data is received without any such request. For instance, the server 510 could be subscribed to a service in which the municipal regulation data is supplied to the server 510 on a periodic basis or whenever there are changes or updates to the municipal regulation data.

At step 4-3, the server 510 processes the municipal regulation data to generate curbside map data. There are many possibilities for the curbside map data. In some implementations, as already described above with reference to FIG. 2, the curbside map data is a curbside layer for a digital map to convey curbside restrictions (e.g. no parking zones, loading zones, etc.). Specific example details of how the curbside map data can be generated are described later with reference to FIGS. 5 and 5A to 5C. Note that step 4-3 can be repeated whenever changes or updates to the municipal regulation data is received.

In the illustrated example it is assumed that the CAV 540 wishes to receive curbside map data, although it is noted that additional or alternative client computing devices may wish to receive curbside map data as well. In some implementations, at step 4-4 there is authentication signalling between the server 510 and the CAV 540. As an example, the CAV 540 could login to authenticate itself for a service to receive curbside map data. Private and public authentication methods are possible. In other implementations, there is no authentication whatsoever in which case there would be no authentication signalling.

At step 4-5, the server 510 receives a request from the CAV 540 for curbside map data. In some implementations, the request includes a region and a date/time for the curbside map data. The region can be based on a current location of the CAV 540, or some other location such as a destination for the CAV 540 for example. The date/time can be based on a current timestamp of the request, or some other date/time such as an expected date/time of arrival at a destination for example. In other implementations, the request includes the region but not the date/time for the curbside map data. In other implementations, the request does not include the region or the date/time for the curbside map data.

At step 4-6, the server 510 identifies a portion of the curbside map data to be provided to the CAV 540. There are many ways that the portion of the curbside map data can be determined. In some implementations, the portion of the curbside map data is determined based on the request message received at step 4-5. As noted above, the request message can include a region and/or a date/time for the curbside map data. Such information from the request message can be used to identify a relevant portion of the curbside map data. However, other implementations are possible in which the server 510 can identify the portion of the curbside map data by other means.

A specific example of identifying and returning a portion of curbside map data is now provided. For this specific example, it assumed that curbside map data includes a curb layer with a segment indicating "Paid Parking 9:00 to 5:00 PM M-F", "No Stopping 7:00 to 9:00 AM and 5:00 to 7:00 PM M-F", and "Free Parking the rest of the time". Information can then be called upon from this curb layer. If the segment is called for at 10:00 AM on Tuesday, Paid Parking would be returned, but if it is called for at 4:00 PM on Saturday, Free Parking is returned. Therefore, the information returned for the segment is date/time dependent in this specific example. However, it is noted that other scenarios are possible in which information returned may not be date/time dependent, for example if a 24/7 curb layer is contemplated.

At step 4-7, the server 510 transmits a message to the CAV 540 conveying at least the portion of the curbside map data. In other implementations, the server 510 simply transmits the entire curbside map data, which would include the relevant portion along with other portions as well.

In some implementations, the curbside map data that is conveyed to the CAV 540 includes a curbside layer for a digital map. In other implementations, the curbside map data that is conveyed to the CAV 540 is merely curbside map data from which the CAV 540 can overlap the curbside data on a map. Either way, the CAV 540 can become aware of parking restrictions or other curbside information from the curbside map data in a timely manner. Therefore, for example, if the CAV 540 is looking to find a parking space in the region, the CAV 540 can use the curbside map data to find a parking spot while avoiding areas that are subject to parking restrictions. This can be helpful by not having to rely on street signage, which could be knocked down, not clearly visible, and/or not up to date.

In the illustrated example, the CAV 540 can be provided with curbside map data in response to a request specifying the region and the date/time for the curbside map data. In some implementations, the request includes additional search parameters for specific information, such that the processing by the server 510 accounts for those additional search parameters, and the curbside map data that is returned to the CAV 540 includes the specific information. As an example, if the CAV 540 wishes to find three nearest loading zones, then this can be specified in the request, such that the processing by the server 510 finds the three nearest loading zones, and the curbside map data that is returned to the CAV 540 includes those three nearest loading zones. Other search parameters can include nearest locations, type of regulation, etc. In some implementations, the additional search parameters are configurable.

In the illustrated example, the server 510 requests and receives the municipal regulation data and generates the curbside map data (i.e. steps 4-1 and 4-3) before the signalling and interaction with the CAV 540 (i.e. steps 4-4 to 4-7). However, other implementations are possible in which these steps are intertwined. For example, in another implementation, the server 510 requests and receives the municipal regulation data in response to receiving the request from the CAV 540 for curbside map data. This implementation could help to ensure that up-to-date information is received, processed and ultimately provided to the CAV 540. Therefore, it is to be understood that the order of steps 4-1 to 4-7 can be varied for different implementations.

Signalling can include peer-to-peer communication or other forms of communication.

Example Implementation

The following describes example methods and systems for automatically generating graphical representations of curbside map data, and augmenting street maps with such data. Some embodiments provide a software product and an API that automates the mapping of curbside restrictions, so as to provide users with a simple and visual way to display curbside restrictions such as No Parking or Commercial Load Zone on a map. In some applications, this map layer could be provided to CAVs to determine where to be stop, load, or park, depending on their journey type. This would be an alternative to existing techniques of using 3D mapping, combined with the CAVs scanning and reading street signage. A problem with street signs is that they can be obstructed, knocked down, or even falsified. In some embodiments, municipal regulations in textual format (either structured or unstructured) are automatically converted into shapefile segments to provide a digital map with a layer of curbside map data.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Figure 5:
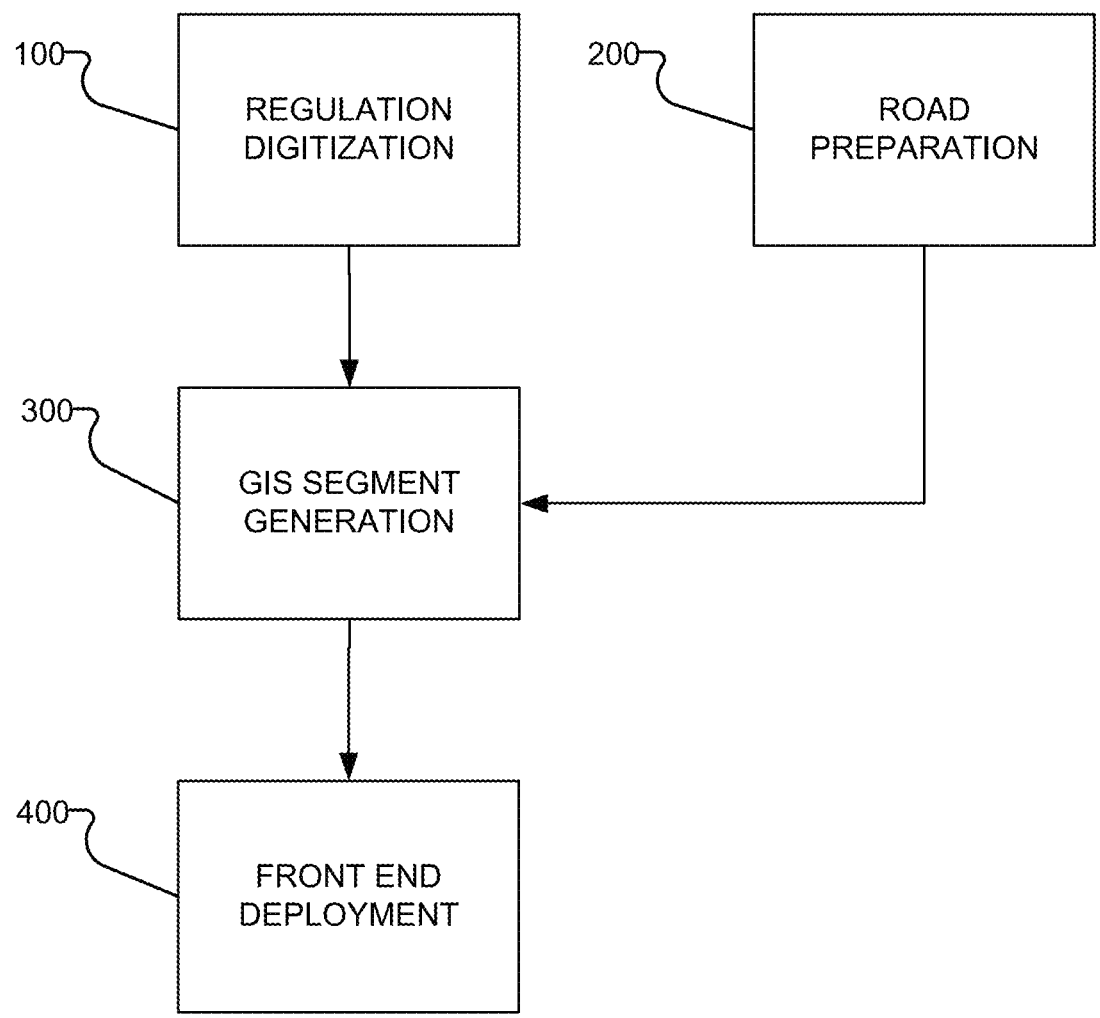
FIG. 5 is a flowchart of an example method for automatically adding curbside map data to a digital street map.

FIG. 5 shows a method for automatically generating graphical representations of curbside map data according to one embodiment of the present disclosure. The method may, for example, be carried out by software running on a processor in communication with one or more data stores that contain municipal data. The method comprises a regulation digitization process 100, a road preparation process 200, a GIS (Geographic Information System) segment generation process 300, and a front end deployment process 400. Generally speaking, the regulation digitization process 100 involves converting existing municipal regulation data into a format suitable for GIS segment generation, the road preparation process 200 involves augmenting existing map data comprising road centrelines with curb location data, the GIS segment generation process 300 uses the outputs of the regulation digitization process 100 and the road preparation process 200 to generate GIS shapefile segments, and the front end deployment process 400 involves uploading the GIS shapefile segments to a platform that provides users with an interface for viewing and interacting with a digital map that includes the curbside map data. Details of processes 100, 200, 300 and 400 are described below with reference to FIGS. 1A, 1B and 1C.

Figure 5A:
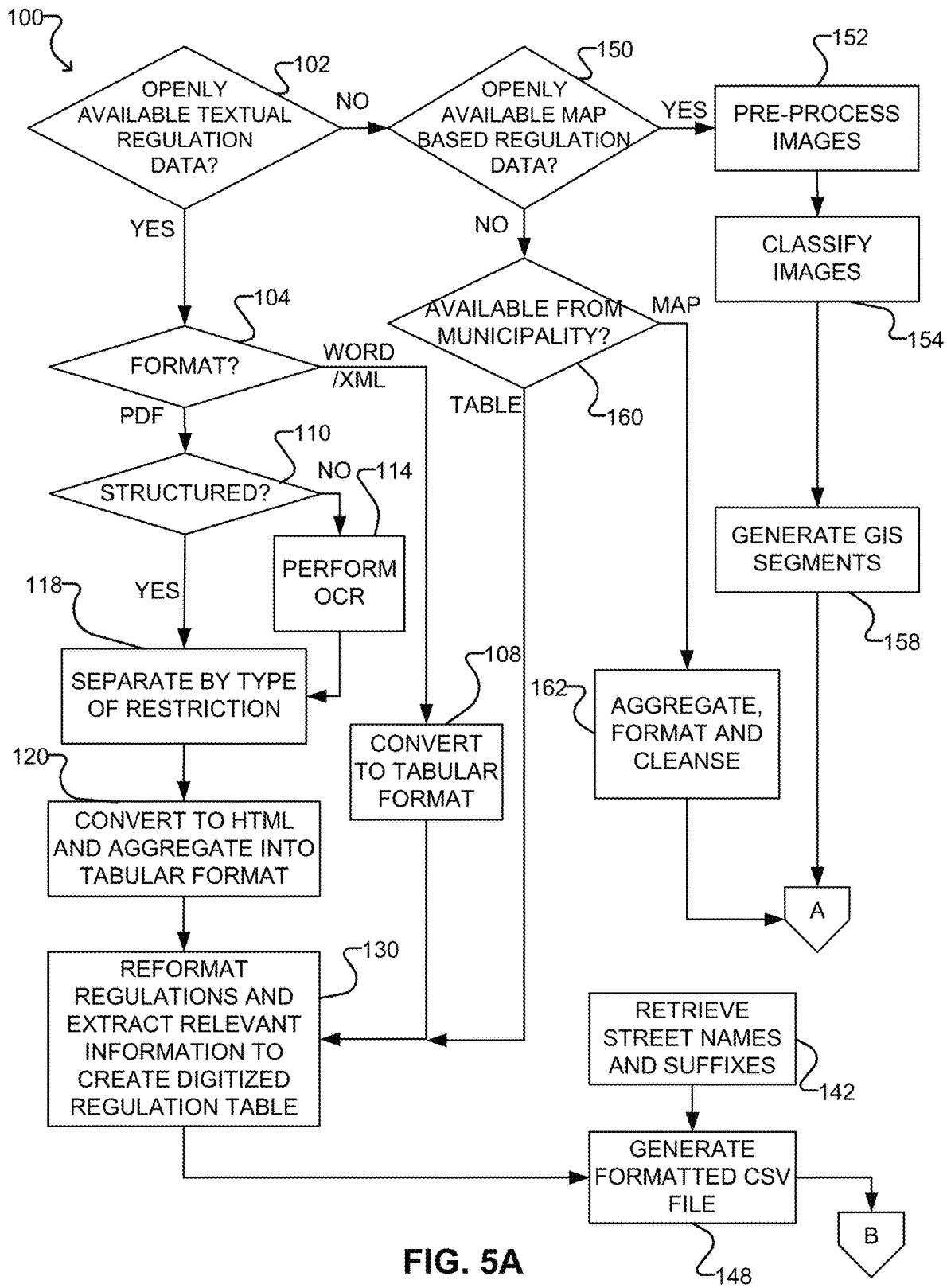
FIG. 5A is a flowchart schematically illustrating steps of a regulation digitization process of the method of FIG. 5.

Referring to FIG. 5A, the regulation digitization process 100 begins at block 102, where the processor determines if street-by-street textual municipal regulation data is openly available. If street-by-street textual municipal regulation data is openly available, the processor retrieves the data and the process proceeds to block 104; if not, the process proceeds to block 150. At block 104, the processor determines the format of the municipal regulation data. If the municipal regulation data is in Microsoft Word or XML format, the processor converts the data to tabular format (e.g. Microsoft Excel format) at block 106.

If the municipal regulation data is a PDF (Portable Document Format) file, the processor determines if the PDF file is structured or unstructured at block 110. If the PDF file is unstructured, the processor performs OCR (Optical Character Recognition) on the PDF file at block 114 to extract the text. After block 114, or if the PDF file is structured, the process proceeds to block 118 where the processor separates the municipal regulation data by type of restriction (e.g. no parking, no stopping, loading zones, etc.) and creates a separate PDF file for each type at block 118. At block 120 the processor converts the PDF files to HTML files and aggregates the HTML files into a single file in tabular format.

After block 108 or 120, the processor formats the tabular file containing the municipal regulation data at block 130 to generate a digitized regulation table. In some embodiments the digitized regulation table provides columns for at least "Street", "Side", "To/From" and "Restriction". The processor then parses the digitized regulation table and retrieves street suffixes and street names (block 142) to generate a formatted CSV file at block 148.

If street-by-street textual municipal regulation data is not openly available, at block 150 the processor determines if map-based regulation data is openly available. If it is, the map-based regulation data is pre-processed at block 152, images are classified at block 154, and GIS line segments are generated at block 158 for use in generating a shapefile segment by process 300 as described below.

If map-based regulation data is also not openly available at block 160 the processor attempts to obtain regulation data from the municipality. If the processor is able to obtain regulation data in tabular format, the process proceeds to block 130 discussed above. If the processor is able to obtain regulation data in a map-based format, the process proceeds to block 162 where the processor aggregates, formats and cleanses the data to provide GIS segments for use by process 300 as described below.

Figure 5B:
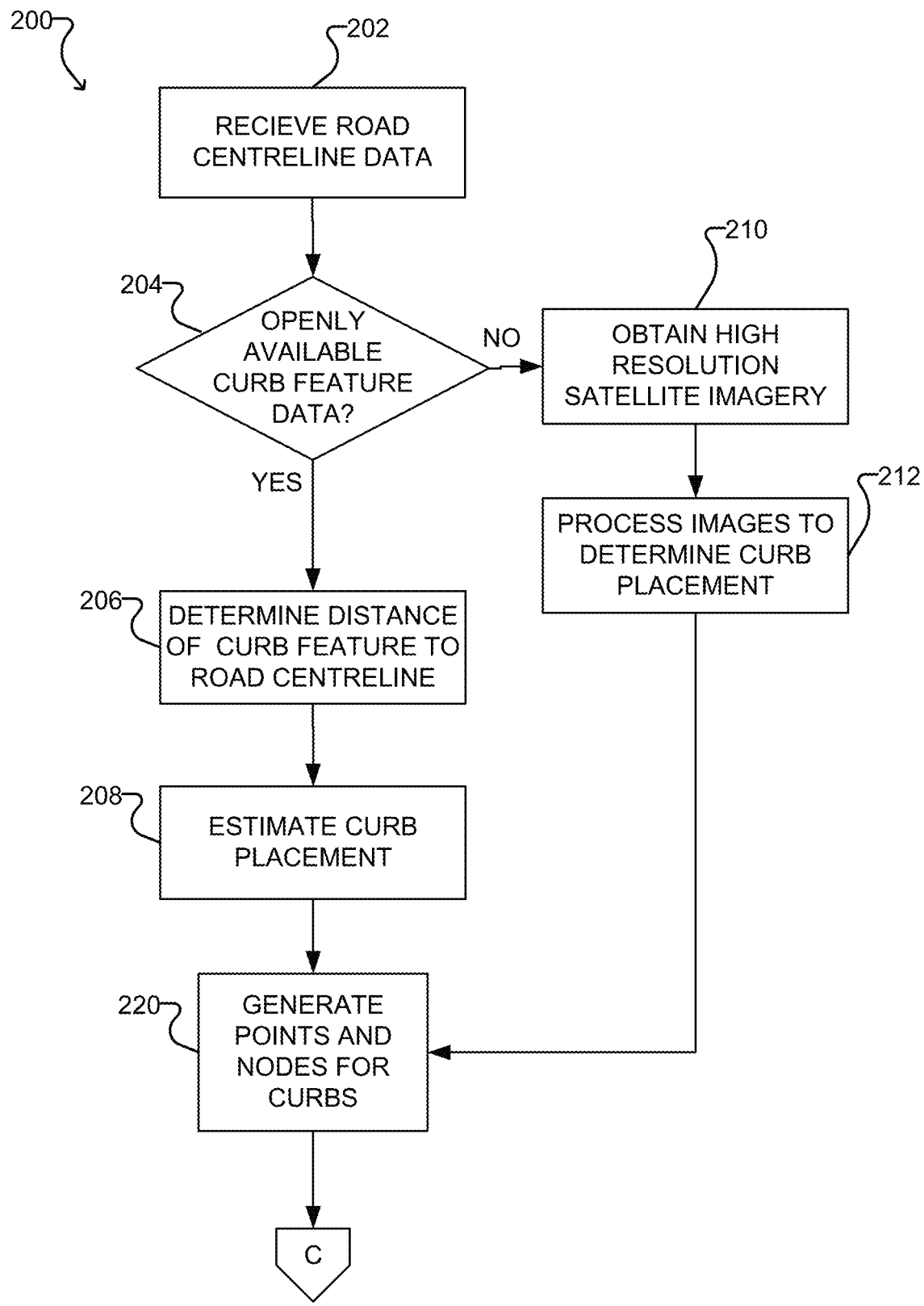
FIG. 5B is a flowchart schematically illustrating steps of a road preparation process of the method of FIG. 5.

Referring to FIG. 5B, the road preparation process 200 begins at block 202 where the processor receives formatted road centreline map data. At block 204 processor determines if curb feature data (e.g. fire hydrants, utility poles, mailboxes, ramps, etc.) is openly available. If it is, at block 206 the processor uses the formatted road centreline data and the curb feature data to determine distances from the centreline to the curb features for each road, and then at block 208 the processor estimates the curb placements based on the determined distances. If curb feature data is not openly available, the process proceeds to block 210 where the processor obtains high resolution satellite imagery, and then at block 212 the processor processes the images to determine curb placements. After block 208 or 212 the process proceeds to block 220 where the processor generates points and nodes for the curbs based on the estimated or determined curb placements.

Figure 5C:
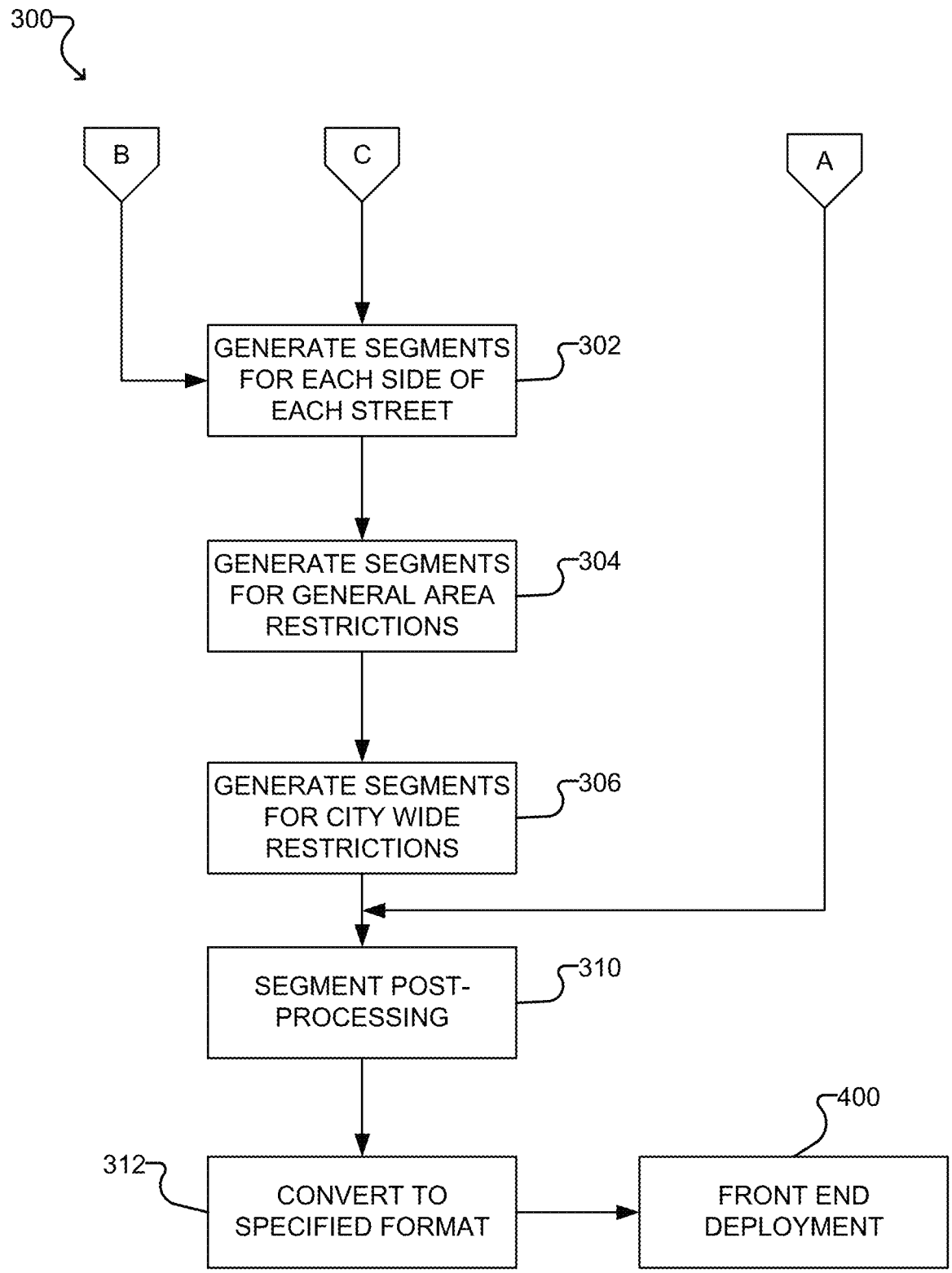
FIG. 5C is a flowchart schematically illustrating steps of a GIS (Geographic Information System) segment generation process of the method of FIG. 5.

Referring to FIG. 5C, in the GIS segment generation process 300 the processor receives the formatted CSV file of municipal regulation data from the regulation digitization process 100 and the points and nodes for the curbs from the road preparation process 200 at block 302 to generate a curb shapefile segment for each side of each street. At block 304 the processor generates a plurality of curb shapefile segments for any general area restriction contained in the municipal regulation data (for example, but spatially joining restrictions from a polygon to a plurality of segments). At block 306 the processor generates a plurality of curb shapefile segments for any city-wide restrictions contained in the municipal regulation data. At block 308 the curb shapefile segments are combined to create a shapefile for curbside map data. At block 310 the curbside map data shapefile is processed to clean geometric features, clip segments at intersections, and generalized or "flatten" overlapping segments. At block 312 the shapefile is formatted to a specified format for use by the front end deployment process 400.

In the front end deployment process 400, the formatted shapefile is uploaded to a digital map platform to provide a curbside layer for a digital map of the municipality. The digital map platform allows users to view and interact with the curbside layer. In some embodiments the digital map platform provides an interface allowing users to update the regulations reflected in the curbside layer. In some embodiments the digital map platform provides users with tools for performing data analysis on the curbside layer. In some embodiments, the digital map platform is configured to monitor a municipal data store for any newly passed regulations and automatically compare any new regulation to previously passed regulations, such that when a curbside restriction is changed by the new regulation the processor automatically updates the curbside layer to reflect the change.

Other

The embodiments of the systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface. For example, the programmable computers may be a server, network appliance, connected or autonomous vehicle, set-top box, embedded device, computer expansion module, personal computer, laptop, personal data assistant, cloud computing system or mobile wireless device. A cloud computing system is operable to deliver computing service through shared resources, software and data over a network. Program code is applied to input data to perform the functions described herein and to generate output information. The output information is applied to one or more output devices to generate a discernible effect. In some embodiments, the communication interface may be a network communication interface. In embodiments in which elements are combined, the communication interface may be a software communication interface, such as those for inter-process communication. In still other embodiments, there may be a combination of communication interfaces.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. In any case, the language may be a compiled or interpreted language. Each such computer program may be stored on a storage media or a device (e.g. ROM or magnetic diskette), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product including a physical non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

Embodiments described herein may relate to various types of computing applications, such as image processing and generation applications, computing resource related applications, speech recognition applications, video processing applications, semiconductor fabrication, and so on. By way of illustrative example embodiments may be described herein in relation to image-related applications.

Throughout the foregoing discussion, numerous references may be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments of the present disclosure may be in the form of a software product. The software product may be stored in a non-volatile or non-transitory storage medium, which can be a CD-ROM (Compact Disk Read-Only Memory), a USB (Universal Serial Bus) flash disk, or a removable hard disk. The software product includes a number of instructions that enable a computer device (personal computer, server, or network device) to execute the methods provided by the embodiments. In some implementations, the software product is stored on a secure server.

The embodiments described herein are implemented by physical computer hardware, including computing devices, servers, receivers, transmitters, processors, memory, displays, and networks. The embodiments described herein provide useful physical machines and particularly configured computer hardware arrangements.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various example embodiments described herein.

The description provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As will be apparent to those skilled in the art in light of the foregoing disclosure, many alterations, substitutions and modifications are possible to the methods and systems described herein. While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as may reasonably be inferred by one skilled in the art. The scope of the claims should not be limited by the embodiments set forth in the examples, but should be given the broadest interpretation consistent with the foregoing disclosure.

The present disclosure may be embodied in other specific forms without departing from its spirit or essential characteristics. The described embodiments are to be considered in all respects only as illustrative and not restrictive.

Numerous modifications and variations of the present disclosure are possible in light of the above teachings. It is therefore to be understood that within the scope of the appended claims, the disclosure may be practised otherwise than as specifically described herein.

We claim:

1. A method for execution by a server, comprising:
receiving, from an external source, municipal regulation data;
generating curbside restriction data from the municipal regulation data, wherein the curbside restriction data identifies zones in which parking is not permitted;
generating a plurality of curbside geographic information system (GIS) segments using the curbside restriction data and existing map data;
combining the curbside GIS segments to generate curbside map data including a curbside layer for a digital map to convey curbside restrictions; and
transmitting, to a client computing device, a message conveying at least a portion of the curbside map data, wherein when textual municipal regulation data is openly available:

receiving the municipal regulation data comprises receiving the textual municipal regulation data; and generating the curbside restriction data comprises separating the textual municipal regulation data by type of restriction, aggregating the textual municipal regulation data into tabular format, generating a digitized regulation table from the tabular format, retrieving street suffixes and street names, and generating the curbside restriction data based on the digitized regulation table along with the street suffixes and street names.

2. The method of claim 1, further comprising:

identifying a region and/or a date/time for curbside map data;

wherein the portion of the curbside map data is identified based on the region and/or the date/time.

3. The method of claim 1, further comprising:

receiving, from the client computing device, a request message; and identifying the portion of the curbside map data based on the request message;

wherein the message conveying at least the portion of the curbside map data is transmitted in response to the request message.

4. The method of claim 3, wherein the request message conveys at least a region for the curbside map data, and the portion of the curbside map data is identified based on the region conveyed by the request message.

5. The method of claim 4, wherein the request message also conveys a date and a time for the curbside map data, and the portion of the curbside map data is identified based on (i) the region and (ii) the date and the time conveyed by the request message.

6. The method of claim 5, wherein the request message also conveys at least one additional search parameter, and the portion of the curbside map data is identified based on the at least one additional search parameter, wherein the at least one additional search parameter comprises any one of nearest location(s) and type of regulation.

7. The method of claim 4, further comprising:

determining a current date and time;

wherein the portion of the curbside map data is identified based on (i) the region conveyed by the request message and (ii) the current date and time.

8. The method of claim 1, further comprising:

signaling with the client computing device to authenticate the client computing device for receiving the curbside map data.

9. A method for execution by a server, comprising:

receiving, from an external source, municipal regulation data;

generating curbside restriction data from the municipal regulation data, wherein the curbside restriction data identifies zones in which parking is not permitted;

generating a plurality of curbside geographic information system (GIS) segments using the curbside restriction data and existing map data;

combining the curbside GIS segments to generate curbside map data including a curbside layer for a digital map to convey curbside restrictions; and transmitting, to a client computing device, a message conveying at least a portion of the curbside map data, wherein when textual municipal regulation data is not openly available but map-based regulation data is openly available:

receiving the municipal regulation data comprises receiving the map-based regulation data; and generating the curbside restriction data and generating the curbside GIS segments comprises classifying images of the map-based regulation data and generating the curbside GIS segments based on the images that have been classified.

10. The method of claim 9, further comprising:

identifying a region and/or a date/time for curbside map data;

wherein the portion of the curbside map data is identified based on the region and/or the date/time.

11. The method of claim 9, further comprising:

receiving, from the client computing device, a request message; and identifying the portion of the curbside map data based on the request message;

wherein the message conveying at least the portion of the curbside map data is transmitted in response to the request message.

12. The method of claim 11, wherein the request message conveys at least a region for the curbside map data, and the portion of the curbside map data is identified based on the region conveyed by the request message.

13. The method of claim 12, wherein the request message also conveys a date and a time for the curbside map data, and the portion of the curbside map data is identified based on (i) the region and (ii) the date and the time conveyed by the request message.

14. The method of claim 13, wherein the request message also conveys at least one additional search parameter, and the portion of the curbside map data is identified based on the at least one additional search parameter, wherein the at least one additional search parameter comprises any one of nearest location(s) and type of regulation.

15. The method of claim 12, further comprising:

determining a current date and time;

wherein the portion of the curbside map data is identified based on (i) the region conveyed by the request message and (ii) the current date and time.

16. The method of claim 9, further comprising:

signaling with the client computing device to authenticate the client computing device for receiving the curbside map data.

17. A method for execution by a server, comprising:

receiving, from an external source, municipal regulation data;

generating curbside restriction data from the municipal regulation data, wherein the curbside restriction data identifies zones in which parking is not permitted;

generating a plurality of curbside geographic information system (GIS) segments using the curbside restriction data and existing map data;

combining the curbside GIS segments to generate curbside map data including a curbside layer for a digital map to convey curbside restrictions; and transmitting, to a client computing device, a message conveying at least a portion of the curbside map data, wherein when textual municipal regulation data is not openly available and map-based regulation data is not openly available:

receiving the municipal regulation data comprises receiving the municipal regulation data from a municipality;

when the municipal regulation data from the municipality is in a table format, generating the curbside restriction data comprises extracting relevant information from the municipal regulation data to generate the digitized regulation table, retrieving street suffixes and street names, and generating the curbside restriction data based on the digitized regulation table along with the street suffixes and street names; and when the municipal regulation data from the municipality is in a map format, generating the curbside restriction data and generating the curbside layer comprises aggregating, formatting and cleansing the municipal regulation data to produce the curbside layer.

18. The method of claim 17, further comprising:
identifying a region and/or a date/time for curbside map data;
wherein the portion of the curbside map data is identified based on the region and/or the date/time.

19. The method of claim 17, further comprising:
receiving, from the client computing device, a request message; and
identifying the portion of the curbside map data based on the request message;
wherein the message conveying at least the portion of the curbside map data is transmitted in response to the request message.

20. The method of claim 19, wherein the request message conveys at least a region for the curbside map data, and the portion of the curbside map data is identified based on the region conveyed by the request message.

21. The method of claim 20, wherein the request message also conveys a date and a time for the curbside map data, and the portion of the curbside map data is identified based on (i) the region and (ii) the date and the time conveyed by the request message.

22. The method of claim 21, wherein the request message also conveys at least one additional search parameter, and the portion of the curbside map data is identified based on the at least one additional search parameter, wherein the at least one additional search parameter comprises any one of nearest location(s) and type of regulation.

23. The method of claim 20, further comprising:
determining a current date and time;
wherein the portion of the curbside map data is identified based on (i) the region conveyed by the request message and (ii) the current date and time.

24. The method of claim 17, further comprising:
signaling with the client computing device to authenticate the client computing device for receiving the curbside map data.

25. A method for execution by a server, comprising:
receiving, from an external source, municipal regulation data;
generating curbside restriction data from the municipal regulation data, wherein the curbside restriction data identifies zones in which parking is not permitted;
generating a plurality of curbside geographic information system (GIS) segments using the curbside restriction data and existing map data;
combining the curbside GIS segments to generate curbside map data including a curbside layer for a digital map to convey curbside restrictions;
transmitting, to a client computing device, a message conveying at least a portion of the curbside map data; and
augmenting the existing map data with curb location data, wherein augmenting the existing map data with curb location data comprises:
receiving formatted road centreline data;
when curb feature data is openly available, using the formatted road centreline data and the curb feature data to determine, for each road, distances from a centreline of the road to curb features of the road, and then determining curb placements based on those distances;
generating points and nodes for curbs based on the curb placements that have been determined.

26. The method of claim 25, further comprising:
when the curb feature data is not openly available, obtaining and processing satellite imagery to determine the curb placements.

27. A method for execution by a server, comprising:
receiving, from an external source, municipal regulation data;
generating curbside restriction data from the municipal regulation data, wherein the curbside restriction data identifies zones in which parking is not permitted;
generating a plurality of curbside geographic information system (GIS) segments using the curbside restriction data and existing map data;
combining the curbside GIS segments to generate curbside map data including a curbside layer for a digital map to convey curbside restrictions; and
transmitting, to a client computing device, a message conveying at least a portion of the curbside map data,
wherein generating the plurality of curbside GIS segments comprises:
generating the curbside GIS segments for each side of each street contained in the existing map data;
generating the curbside GIS segments for general area restrictions contained in the municipal regulation data; and
generating the curbside GIS segments for any city-wide restrictions contained in the municipal regulation data,
wherein generating the curbside layer comprises:
combining the curbside GIS segments, cleaning geometric features and clipping the curbside GIS segments at intersections, and generalizing or flattening any overlapping segments; and
formatting the curbside layer for deployment.

* * * * *